March 8, 1932.    G. H. PHELPS    1,848,271
WELDING APPARATUS AND METHOD
Filed Sept. 13, 1928    3 Sheets-Sheet 1
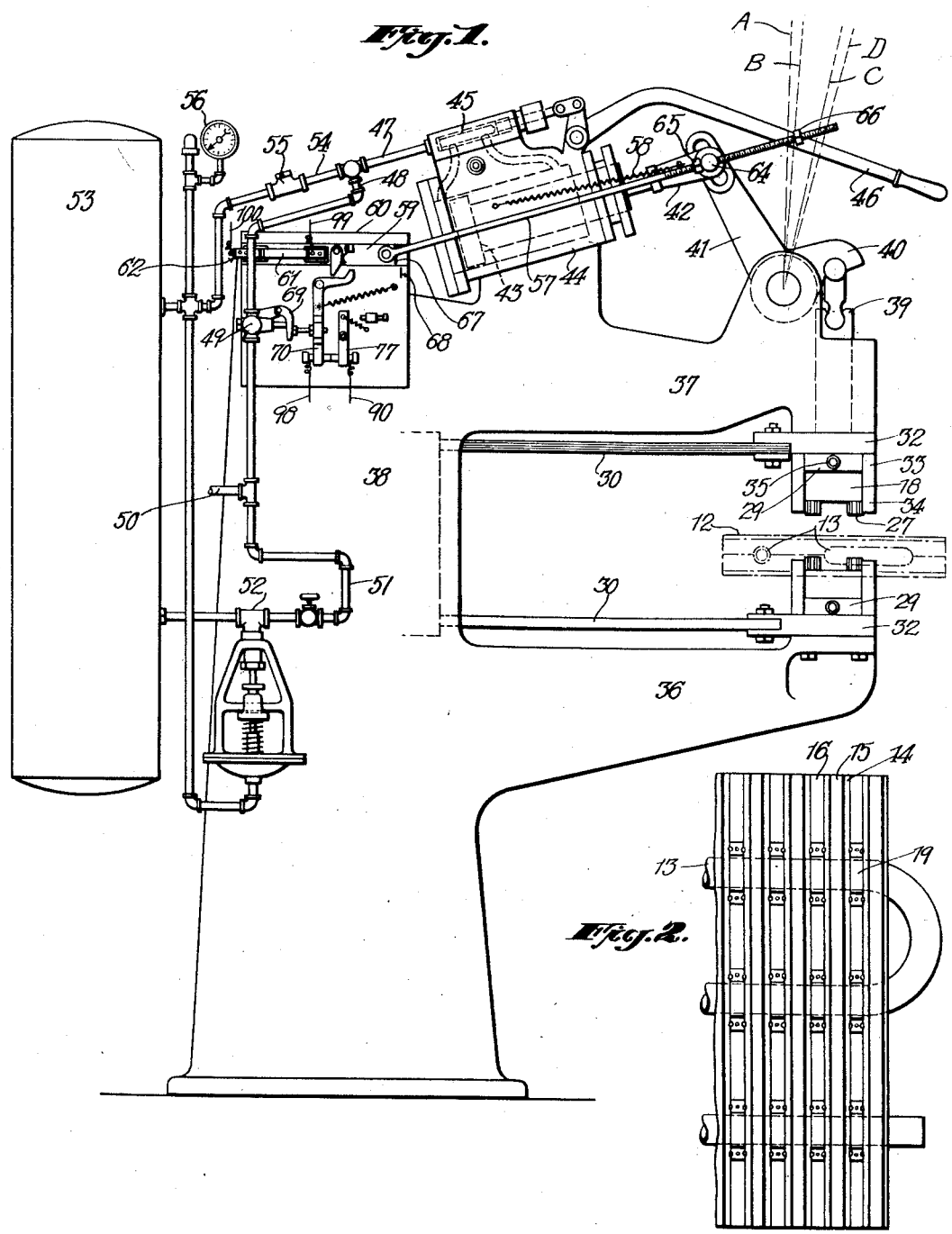
INVENTOR
George H. Phelps
BY
Anthony ATTORNEY March 8, 1932. G. H. PHELPS 1,848,271
WELDING APPARATUS AND METHOD
Filed Sept. 13, 1928 3 Sheets-Sheet 2
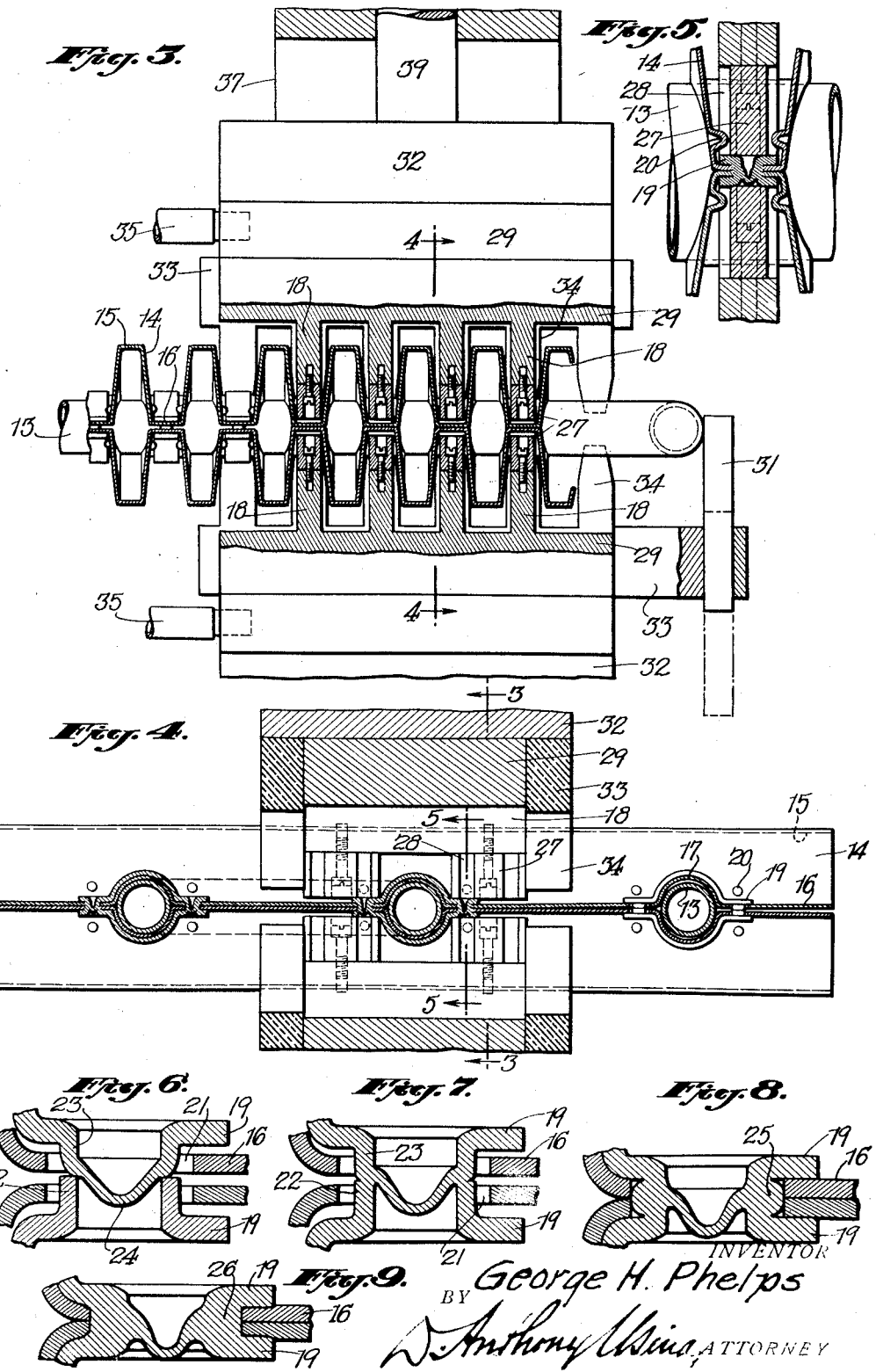

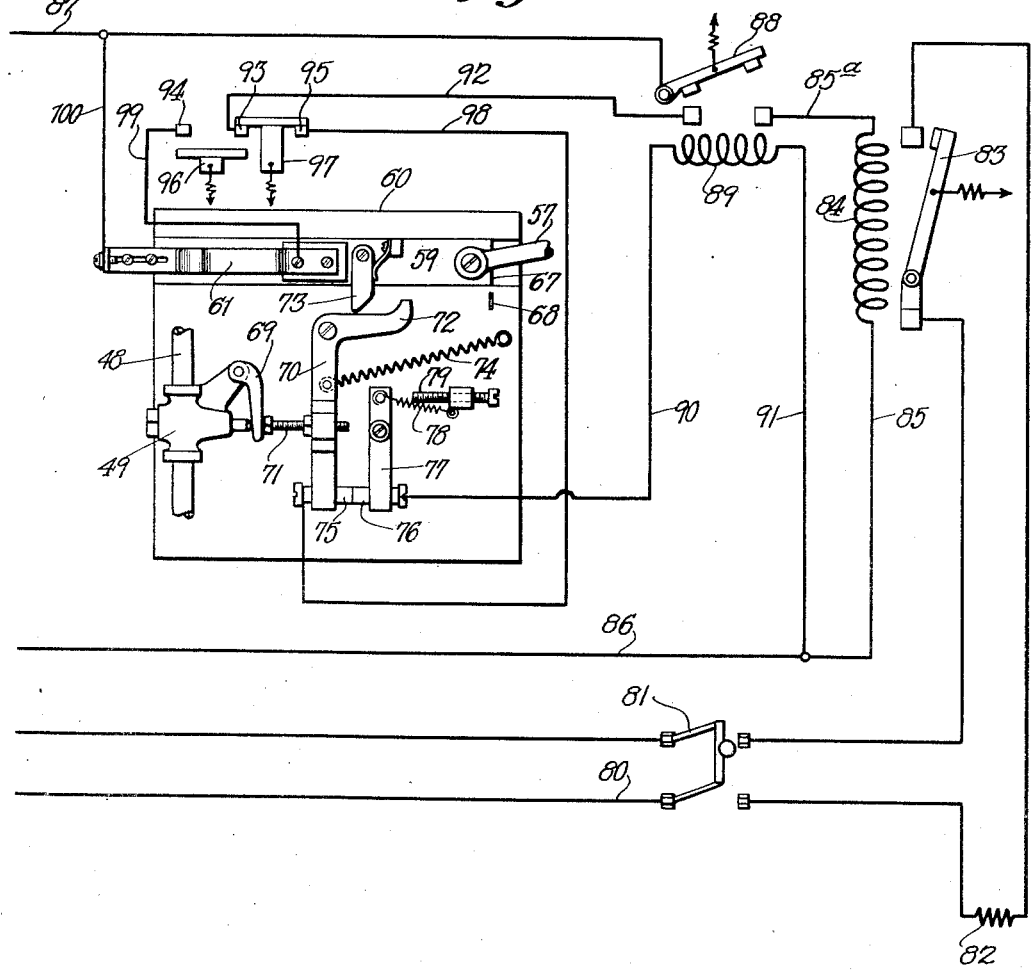

Patented Mar. 8, 1932

1,848,271

UNITED STATES PATENT OFFICE

GEORGE H. PHELPS, OF WAREHOUSE POINT, CONNECTICUT, ASSIGNOR, BY MESNE ASSIGNMENTS, TO METROPOLITAN ENGINEERING COMPANY, A CORPORATION OF NEW YORK

WELDING APPARATUS AND METHOD

Application filed September 13, 1928. Serial No. 305,652.

The invention aims to provide an improved method and apparatus for welding various articles and designed particularly for uniting the parts of a certain type of radiator.

The acompanying drawings illustrate an embodiment of the invention.

Fig. 1 is a side elevation of the machine;

Fig. 2 is a side elevation of part of a radiator;

Fig. 3 is a front elevation of the electrodes, partially in section on the line 3—3 of Fig. 4;

Fig. 4 is a section on the line 4—4 of Fig. 3;

Fig. 5 is an enlarged section on the line 5—5 of Fig. 4;

Figs. 6, 7, 8 and 9 are enlarged sections of the joint in successive stages of the welding operation;

Fig. 10 is a horizontal section of a sliding contact;

Fig. 11 is a diagram of the electrical connections.

In Fig. 1 the assembled radiator is illustrated in dotted lines at 12. The side elevation, Fig. 2, and the sectional view in Figs. 3 and 4 illustrate the construction. A pipe 13 passes back and forth in parallel lengths and carries the heating medium. Plates are applied at each side of the pipe, of sheet metal corrugated to form transverse fins 14 united in pairs at their outer edges by longitudinal plates 15 and alternately at their inner edges by plates 16. The inner portions of the corrugations are shaped to provide recessed portions 17 (Fig. 4) fitting the pipe 13. The plates 16 on opposite sides of the pipe are united to each other immediately above and below the pipe by welding operations described hereinafter. The machine is particularly adapted to this work, having electrodes or similar tools arranged to enter the open spaces between the fins. Four pairs of electrode holders 18 are provided according to Fig. 3. Where the radiator is of a size requiring more than four lines of welds, it will be shifted step by step, to bring successive groups of four lines of joints in position as the upper electrodes are raised after the previous operation.

The joint is strengthened in the case illustrated by means of straps applied to the outside; the tube and corrugated sheets being preferably of thin copper and the straps of steel. The radiator made in this way is the subject of certain previous applications of Murray and others.

The straps 19 are shown in Fig. 4 embracing the pipe and the corrugated sheet, with flat portions lying against the plates 16. The parts are fitted together loosely as shown at the right of Fig. 4. The fins 14 are provided with indentations 20 (see enlarged Fig. 5) which overlie the straps and hold them in assembled position. The machine presses the opposite straps 19 toward each other. The welding operation clamps the recessed portions 17 into close contact with the pipe, and the welding is completed with the parts in this position.

The sheets 16 are punched to form openings 21, Fig. 6. One of the straps 19 is punched and flanged to form a hollow projection 22. The other is indented and flanged to form a similar projection 23 which engages the end of the projection 22 and which has a pointed portion 24 entering the same. This serves as a guide and means for holding the two straps in proper registration with each other for butt welding them together.

In the first stage of softening and pressing them together, the parts 22 and 23 are welded as shown in Fig. 7. The continued pressure forces the two plates 16 together and swages out the metal of the straps at 25 to substantially fill the holes 21, as in Fig. 8. In the final stage, Fig. 9, the edges of the plates 16 are somewhat compressed and the welded metal of the projections takes the shape 26, completely filling the holes and forming a rigid connection.

Fig. 4 shows the joint at the left completed and the radiator shifted to bring the central pipe section between the electrodes, which have just completed a joint. At the right-hand end, the parts are assembled ready to be shifted to position between the electrodes.

Each electrode carrier 18 has two electrodes 27 (Fig. 4) attached to its face and these are provided with vertical grooves 28 to pass the projections 20 without interference.

The individual electrode carriers 18 are integral extensions from holders 29 carried by heads 32 which are connected by conductors 30 (Fig. 1) to the secondary of a transformer, not shown, by which the welding current is supplied. The lower head 29 is fixed, and carries a gauge 31 (Fig. 3) at one side which by contact with the bend of the pipe 13 holds the latter in proper initial position. The corrugations of the sheets determine their location in the machine; and, therefore, their proper position on the pipe. The pipe and the finned structure are united in proper relation by the first series of welding operations. The gauge 31 is dropped for subsequent operations. The set of four welds being completed along the several lengths of pipe, the assembled parts are shifted longitudinally to bring the next set of four corrugations under the electrodes; and so on to the last set. The welding of the complete radiator is therefore a matter of only a few identical operations of the machine, depending on the size of the radiator and the number of joints which it is designed to make at each operation. The number of electrodes in the machine may be varied to fit various conditions.

The machine is particularly designed for the Murray method of welding by an extraordinary large current applied for a very brief regulated period of time. Within even this brief time limit it is useful to regulate and vary the pressure.

The pressure and current control are especially adapted for this sort of work to give a light pressure on the work for the welding operations of Figs. 6 and 7, followed by a heavy stroke to swage the projections on the straps to completely fill the holes in the plates and clamp the latter together in a rigid unitary structure, Fig. 9.

Each of the heads 32 carries a plate 29 through which the cooling water passes and from which the several electrode carriers 18 extend. At the front and the back of the plates 29 there are strips 33 of insulating material with gauges 34 depending beyond the holders 18 and shaped as shown at the extreme right and left of Fig. 3. The end gauges 34 hold the corrugations immediately beyond those which are being welded. The intermediate gauges hold the corrugations in shape for a substantial distance in both directions from the welding point, as in Fig. 4. Also, as Fig. 3 shows, they hold the lateral fins 14 clear of the electrodes and their holder 18 so as to prevent accidental contact and burning.

The lower half of the structure is held in shape as soon as the work is placed on the lower electrodes and gauges. The lowering of the upper electrode similarly holds the upper part of the assembled structure in shape before the actual welding commences. This is important because the structure is made up of small strips and of very thin flexible metal, which parts are liable to easy displacement and distortion. The electrode heads 29 may be cooled by water introduced through pipes indicated at 35.

The lower head 29 is fixed on a supporting arm 36 of the machine. The upper head is carried in a projecting arm 37. The two arms project forward from a rear column 38 within which is carried the transformer. The upper head is mounted on the end of a rod 39 sliding through a suitable vertical guideway and lifted and lowered by a short arm 40 on a crank lever pivotally mounted in the arm 37 and having a long arm 41 having a slotted end engaged by a pin on the end of a piston rod 42 carrying a piston 43 in a double-acting air cylinder 44 which is operated through an ordinary slide valve 45 which is shifted to forward or reverse position by shifting the hand lever 46 downward or upward.

The apparatus is supplied with air at two pressures, light and heavy. The light pressure, for example, may be as low as five pounds per square inch, and the heavy pressure one hundred pounds. The actual pressures will depend on the work to be done and the weight of the parts to be operated, and may be regulated with exactness.

The air admission pipe 47 (for admitting air to the cylinder) has a high pressure branch 48 leading to a spring closing valve 49 to a supply pipe 50 and thence by a branch 51 through an automatic regulating valve 52 to a reservoir 53.

Assuming the hundred pounds pressure admitted through the pipe 50, the air will be transmitted through the regulator 52 and admitted to the reservoir at five pounds. The air inlet pipe 47 has a second branch 54 leading to the tank 53. A check valve 55 prevents the high pressure from backing into the reservoir. The gauge 56 enables the operator to determine the pressure in the tank so that he can adjust it as desired.

Actuated by the piston rod 42 is a link 57 pulled back by a spring 58 to the retracted position of Figs. 1 and 10. At its rear end, it is connected to a slide 59 mounted on a plate 60 on the side of the frame and grooved to accommodate the slide. The slide carries a spring contact 61 which travels over a "no start" contact 62 a part of which is covered by an insulating strip 63. The rod 57 passes freely through a stud 64 pivotally mounted in the end of the piston rod and carries adjustable stops 65 and 66 threaded thereon.

Starting from the positions of Figs. 1, 10 and 11 the forward movement of the piston rod, and downward movement of the electrodes, is without effect on the slide until the stud 64 strikes the stop 66. This is the position of the crank arm 41 indicated by the dotted line at A.

When the crank arm has moved forward to the line B, the contact 61 of the slide passes beyond the insulation on to the metal 62 and the welding current can be applied and the softening of the metal commenced. Through the angle from B to C the heat and the light pressure are continued. At this point the heavy pressure is introduced (by the device hereinafter described) and the advance is continued to the line D. completing the weld.

The current is interrupted automatically at the right instant. When the weld is completed the operator lifts the controlling arm 46 which works the air valve to reverse the action of the piston, lifting the upper electrodes, the stud 64 strikes the stop 65 and restores the slide 59 to its original "no contact" position.

Gauge lines 67 and 68 are marked on the slide and the plate to show the position of the slide when arm 41 is in position "B" when the electrode is new and absolutely accurate in length. As it wears a little, the position of the slide should be adjusted accordingly by means of the stops 65 and 66.

The valve 49 in the high pressure line has a pivoted arm 69 bearing on the end of its stem. A pivoted arm 70 has an adjustable projection 71 which bears on the arm 69. An arm 72 constituting part of the arm 70 has a projecting portion lying in advance of a spring pressed tripping device 73. As the slide 59 is carried to the right, it draws the trip 73 over the arm 72 and opens the valve 49. When the trip 73 passes the arm 72, the spring 74 retracts the latter. The arm 73 on its backward movement pivots and rides over the end of the arm 72 freely. Such tripping motion is not essential. The high pressure may be maintained not only at the end of the welding stroke, but also at the beginning of the retraction of the electrodes. The arm 70 carries also a contact point 75 engaging a contact point 76 on an arm 77 which is pivoted and retracted by a spring 78 with a motion limited by the adjustable stop 79.

The circuits are illustrated in Fig. 11. The alternating current comes through the leads 80 and a switch 81 (which is closed during welding) to the primary of the transformer 82 of the machine. In this primary circuit is a spring retracted contactor 83 drawn to the closed position by a magnet coil 84 which is connected by one lead 85 to one of the direct current lines 86. The opposite direct current line 87 passes through a similar spring retracted switch 88 drawn to its closed position by a magnet coil 89 in a controlling circuit. The switch when closed connects the main direct current line 87 to a lead 85a of the coil 84.

The coil 89 is in a circuit which includes the leads 90 and 91, the former going to the contact 76 and the latter to the direct current main 86. From the switch 88 a lead 92 passes to the central contact 93 of the three contacts 93, 94 and 95, which are connected by spring retracted push button switches; the start button 96 and the emergency stop button 97. From the terminal 95 the lead 98 goes to the terminal 75. From the terminal 94 a lead 99 goes to the sliding contact 61. The fixed contact 62 is connected by a lead 100 to the main 87.

The operation is as follows:

The assembled parts of the radiator are inserted when the upper electrode is lifted, as in Fig. 1. The operator then pulls down the hand lever 46 which admits low pressure air to the rear of the cylinder 44 and causes the upper electrodes to be pressed down until the parts are firmly pressed in proper position between the electrodes. At that time the slide will have been pulled by the adjustable rod to a position where the contact 61 is beyond the insulation 63 and is resting on the contact 62.

Now the operator pushes the starting button 96. This completes the circuit through the coil 89 which closes the switch 88 and holds it shut; which causes the main contactor 83 to close and complete the circuit through the primary 82 of the transformer.

The operation continues under low pressure until near the end of the weld. The dog 73 then rides over the end of the arm 72 and opens the high pressure valve 49 letting high pressure into the cylinder, immediately after which the contact 75 is moved to the open position to break the controlling circuit through the coil 89 whereupon the switch 88 springs open and breaks the circuit holding the contactor 83 closed so that the latter springs open and breaks the welding circuit; the heavy air pressure continuing.

The purpose of the "no start" contact on the terminal 62 is to prevent operation if the upper electrode does not come down fully, as when the operator has the radiator in improper position on its support. In that case the pressing of the starting button will have no effect because the circuit will not be completed, being broken at the terminals 61 and 62.

The starting button is held in the open position normally by a spring. An emergency stop button 97 is held in closed position by a spring. It is used to break the control circuit in any emergency before the complete series of operations has been carried out.

Pushing the button 97 breaks the circuit through the coil 89 and results in the opening of the contactor 83 and the breaking of the primary circuit so that there is no current flow through the work.

The general design of the machine to adapt it to the making of radiators of the described type, and the general method are covered in certain previous applications of Thomas E. Murray, Jr., and myself No. 91,023 filed February 27, 1926 since matured into Patent No. 1,788,201 issued on January 6, 1931, and No. 193,173 filed May 21, 1927 since matured into Patent No. 1,750,643, issued on March 18, 1930.

The method of uniting the parts by welding fastening straps through the sheets is covered in certain prior applications of Murray & Bennett Nos. 203,437 and 203,438, filed July 5, 1927 and of myself No. 249,538, filed January 26, 1928. See also pending application of Thomas E. Murray, Jr., for Radiators, Serial No. 423,330, filed January 25, 1930.

Various modifications may be made by those skilled in the art without departing from the invention as defined in the following claims.

1. A welding machine including means for pressing the parts together and means for passing a welding current through them, said pressing means being operated by air pressure, means for supplying air thereto at different pressures, and means actuated by the movement of the pressing means to a determined point in their stroke for automatically admitting air at the higher pressure.

2. A welding machine including means for pressing the parts together and means for passing a welding current through them, said pressing means being operated by air pressure, means for supplying air thereto at different pressures, said means including a high pressure valve, an arm for opening the same and means connected with the movable electrode for actuating said arm at a determined point in the travel of the electrode to open said valve.

3. A welding machine including a pneumatically operated electrode, means for passing a welding current through it, means for supplying air at different pressures and controlling means adapted, first, to advance the electrode under low pressure to a determined distance and apply the welding current, second, to continue the advance under higher pressure and, third, to cut off the welding current.

4. A welding machine including a pneumatically operated electrode, means for passing a welding current through it, means for supplying air at different pressures and controlling means adapted to, first, advance the electrode under low pressure to a determined distance and applying the welding current, second, to continue the advance under higher pressure and third to cut off the welding current and means for preventing application of the welding current until the electrode has advanced to a determined position of engagement with the work.

5. A welding machine having a movable electrode, a controlling circuit for the welding current, sliding contacts in said circuit actuated by the movement of the electrode and a push button for closing said circuit, said sliding contacts being held out of conductive engagement over a period corresponding to the initial advance of the electrode to a correct position of engagement with the work so that the pressing of the starting button cannot close the circuit until the electrode has moved to said position.

6. A welding machine for welding corrugated sheets having electrodes adapted to enter the corrugations and having guides adapted to enter the corrugations at points alongside of the electrodes to hold the corrugations in shape and the sides of the corrugations out of contact with the electrodes.

7. A welding machine adapted to weld a longitudinal member between two transversely corrugated members, said machine including in combination a gauge for engaging the end of and thus determining the location of the longitudinal member in the machine and means for engaging and thus determining the position of said corrugated members in the machine so as to hold said parts in proper position with relation to each other during the operation of the machine.

8. A welding machine including a movable electrode, a pneumatic device for advancing it, means for passing a welding current through it, means for supplying air at different pressures to said pneumatic device and timing mechanism operated by the advance of said pneumatic device, said timing mechanism including means for holding the welding circuit open adapted to be moved by an initial advance to an inoperative position so as to permit the closing of the circuit, a valve for admitting the higher pressure adapted to be opened at a further advance of said pneumatic device, and a circuit breaker which is actuated by the continued advance of said pneumatic device.

9. The method of welding which consists in pressing the parts together with a lower air pressure, passing a welding current through them, maintaining the lower pressure on the work as the latter softens and compresses, and applying a higher air pressure at a determined point in the take-up of the work.

10. The method of welding which consists in pressing the parts together with a lower air pressure, passing a welding current through them, maintaining the lower pressure on the work as the latter softens and compresses, applying a higher air pressure at a determined point in the take-up of the work, and cutting off the welding current while continuing the higher air pressure.

In witness whereof I have hereunto signed my name.

GEORGE H. PHELPS.